United States Patent
Sinsabaugh et al.

(10) Patent No.: US 8,822,057 B2
(45) Date of Patent: Sep. 2, 2014

(54) HIGH SURFACE AREA FLOW BATTERY ELECTRODES

(75) Inventors: Steven L. Sinsabaugh, Uniontown, OH (US); Gregory Pensero, Abingdon, MD (US); Han Liu, Lutherville-Timonium, MD (US); Lawrence P. Hetzel, Fallston, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 192 days.

(21) Appl. No.: 13/274,495

(22) Filed: Oct. 17, 2011

(65) Prior Publication Data

US 2013/0095361 A1    Apr. 18, 2013

(51) Int. Cl.
*H01M 4/36*    (2006.01)
*H01M 6/24*    (2006.01)
*H01M 8/02*    (2006.01)
*H01M 4/62*    (2006.01)
*H01M 8/18*    (2006.01)

(52) U.S. Cl.
CPC ............ *H01M 8/188* (2013.01); *H01M 8/0228* (2013.01); *H01M 4/625* (2013.01); *H01M 8/0289* (2013.01); *Y02E 60/528* (2013.01); *H01M 8/0245* (2013.01); *Y02E 60/12* (2013.01)
USPC ........................................................ 429/101

(58) Field of Classification Search
None
See application file for complete search history.

(56) References Cited

U.S. PATENT DOCUMENTS

| | | | |
|---|---|---|---|
| 6,787,259 B2 | 9/2004 | Colborn et al. | 429/23 |
| 7,309,540 B2 | 12/2007 | Wang | 429/33 |
| 8,158,217 B2 | 4/2012 | Shah et al. | 427/577 |
| 8,168,291 B2 | 5/2012 | Shah et al. | 428/293.4 |
| 2006/0269827 A1* | 11/2006 | Liu et al. | 429/44 |
| 2008/0160180 A1* | 7/2008 | Debe | 427/115 |
| 2008/0299439 A1 | 12/2008 | Wang | 429/34 |
| 2009/0081441 A1 | 3/2009 | Shah et al. | 428/222 |
| 2009/0208807 A1 | 8/2009 | Miyachi et al. | 429/33 |
| 2010/0003545 A1* | 1/2010 | Horne et al. | 429/12 |
| 2010/0047671 A1 | 2/2010 | Chiang et al. | 429/50 |
| 2011/0124253 A1 | 5/2011 | Shah et al. | 442/60 |
| 2012/0045680 A1 | 2/2012 | Dong et al. | 429/109 |
| 2012/0219881 A1 | 8/2012 | Sivarajan | 429/505 |

OTHER PUBLICATIONS

Yan et al., Multi-walled carbon nanotubes used as an electrode reaction catalyst for VO2 +/VO2+ for a vanadium redox flow battery, Carbon 49(2011) 3463-3470), Available online Apr. 22, 2011.*
International Search Report mailed Dec. 6, 2012 in corresponding application PCT/US2012/059632.
*Components for Flow Batteries*—SGL Group; The Carbon Company; May 2011.

(Continued)

*Primary Examiner* — Patrick Ryan
*Assistant Examiner* — Jose Colucci Rios
(74) *Attorney, Agent, or Firm* — Renner Kenner Greive Bobak Taylor & Weber

(57) ABSTRACT

A flow cell battery includes at least one anode and at least one cathode, with a separator membrane disposed between each anode and each cathode. Each anode and cathode includes a bipolar plate and a carbon nanotube material positioned proximally at least one side of the bipolar plate.

15 Claims, 3 Drawing Sheets

(56) References Cited

OTHER PUBLICATIONS

*Multi-walled Carbon Nanotubes Electrodes for the All Vanadium Redox Flow Battery*; Lin et al.; 2009; Energy and Environment Laboratories Industrial research Institute; Taiwan; Department of Energy and Resources; National United University; Taiwan.

*Electromechanical investigation of polyhalide ion oxidation-reduction on carbon nanotube electrodes for redox flow batteries*; Shao et al; Electrochemistry Communications; 11; Sep. 2009; pp. 2064-2067.

*Electrochemical characterisation of activated carbon particles used in redox flow battery electrodes*; Radford et al; Journal of Power Sciences 185; Aug. 2008; pp. 1499-1504.

*Highly hydroxylated carbon fibres as electrode materials of all-vanadium redox flow battery*; Yue et al; ScienceDirect; Carbon 48; May 2010; pp. 3079-3090.

*Nitrogen-dopes mesoporous carbon for energy storage in vanadium redox flow batteries*; Shao et al.; Journal of Power Sources 195; Jan. 2010; pp. 4375-4379.

\* cited by examiner

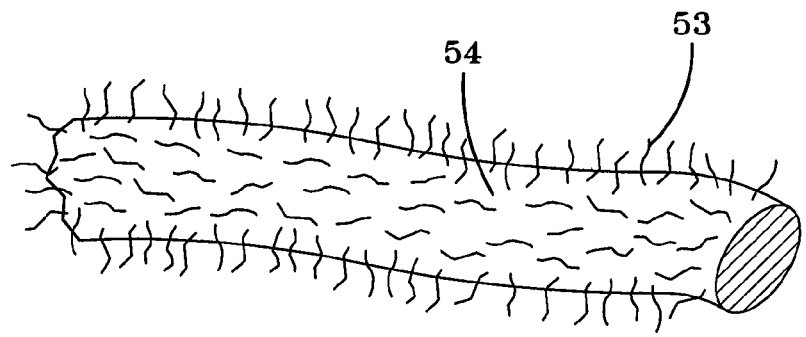
FIG-3
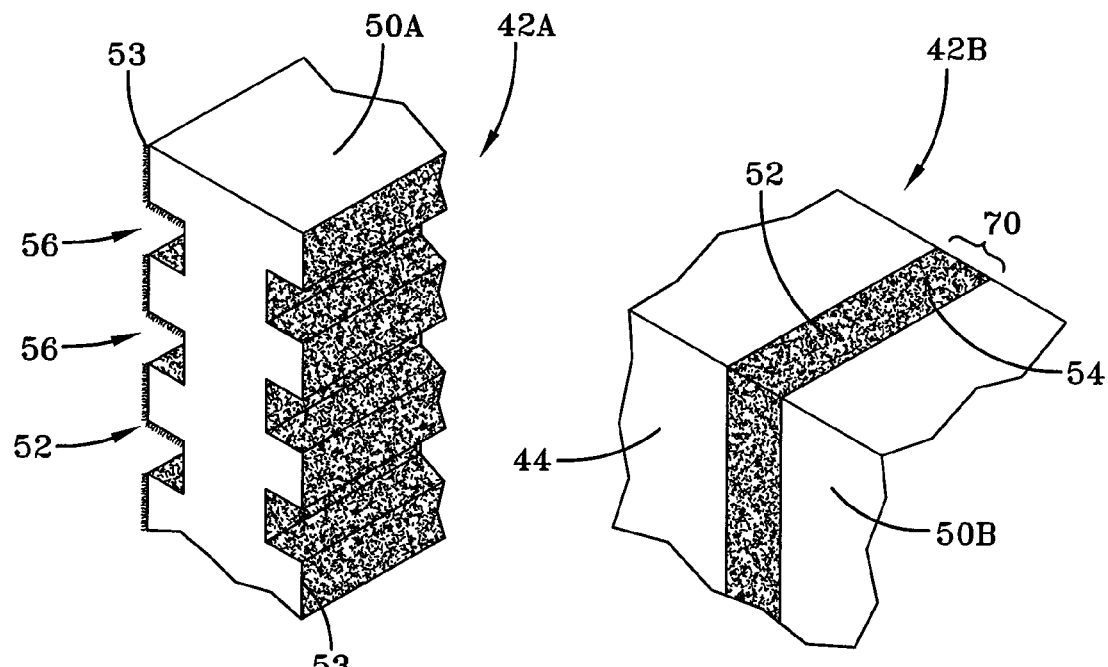
FIG-4
FIG-5

HIGH SURFACE AREA FLOW BATTERY ELECTRODES

TECHNICAL FIELD

Generally, the present invention is directed to large scale (1 KWh-many MWh) electrical energy storage devices. Specifically, the present invention is directed to rechargeable batteries in the form of flow batteries. In particular, the present invention is directed to improved electrode configurations for flow batteries and potentially other types of batteries.

BACKGROUND ART

With the desire to utilize "green" energy and renewable energy sources, there is a desire to incorporate these intermittent types of energy sources into the power grid. Intermittent sources include, but are not limited to wind, solar, photovoltaics and wave power. For example, if winds are not present, the wind turbines do not generate electrical energy; however, when they do produce energy, the current electrical grid cannot always handle large quantities of the energy produced. Grid connected energy storage devices would enable capturing excess energy from these intermittent renewable energy sources, and releasing the stored energy on the grid when it is needed. This combination of renewable energy sources and grid energy storage would support energy independence, reduced emissions and renewable energy sources. There is also a need for reliable grid energy storage devices so as to relieve transmission congestion, allow for energy price arbitrage, and improve the overall quality of the power grid.

It is believed that flow batteries are a viable solution for creating and improving grid storage. Flow batteries can potentially provide efficient modular energy storage at a potentially low cost. They can be independently operated and provide adequate energy and power ratings by utilizing replenishable-liquid reactants and have low cycling impacts and a long life. Flow batteries also have other uses as it relates to microgrid or small power systems and for use as backup power supplies. However, the cost of these systems has prevented wide-scale deployment. A major portion of the system cost is in the flow battery cell stack. To a large extent, the stack costs are limited by the current density that can be put through the cell stack. A higher current density enables more power to be generated in a given cell stack and effectively decreases the cost per watt. But with current state of art low surface area electrode, higher current density will lead to higher energy loss which increases operational cost. Thus, the electrodes need to have a much greater electroactive surface area, while still managing to minimize cost. Current flow battery systems use carbon-based materials, such as carbon felts, for the electrodes.

Referring to FIG. 1, it can be seen that a known flow battery configuration is designated generally by the numeral 10. The battery 10 is provided in a single cell configuration but skilled artisans will appreciate that multiple cells can be incorporated into a stack, and multiple stacks can be employed. In any event, a flow battery comprises an anode 12 and a cathode 14, both of which are referred to as electrodes. An anolyte tank 16 and a catholyte tank 18 direct respective fluid materials through an anode flow area 22 and a cathode flow area 24. A separator membrane 20 is used to separate the anolyte flow area 22 from the catholyte flow area 24 while allowing ion exchange between the two flow areas. As these materials flow through their respective channels, electrical power is generated by redox reactions, in which electrons are drawn through an external electric load 26 as schematically represented by a light bulb.

Skilled artisans will appreciate that the flow battery is a rechargeable battery in which anolyte and catholyte containing one or more dissolved electroactive species flows through the electrochemical cell that converts the chemical energy directly into electricity. Flow batteries can be recharged by re-flowing the electrolyte liquids through the flow areas as an external electrical power source is applied to the electrodes, effectively reversing the electrical generation reactions. The flow battery is advantageous in that the reaction of active species in the electrolyte permits external storage of reactants, thereby allowing independent scale up of power and energy density specifications. Moreover, the ability to externally store the reactants avoids self-discharge that is observed in other primary and secondary battery systems. As such, the energy is effectively stored in the anolyte and catholyte tanks until needed by the load.

Various chemistries are utilized in the operation of flow cell batteries. In particular, different types of anolyte and catholyte materials may be utilized. For example, the zinc bromine system may be utilized wherein zinc plating is maintained in the cell stack. These types of configurations utilize high efficiency and low cost reactants. Vanadium redox technology may also be utilized. This provides high efficiency but low energy density. There is minimal risk of cross-contamination between the materials, however the vanadium is an expensive material and the pentoxide utilized is considered a hazard after it is no longer usable. Another type of flow battery utilizes iron-chrome. Its advantage is in the use of low cost reactants, however it currently only provides for smaller type systems in comparison to the zinc-bromine or vanadium redox embodiments. There are additional chemical couples that could be utilized in a flow battery configuration.

Flow batteries typically use carbon felt electrodes. This kind of configuration is advantageous in that the carbon electrodes are chemically compatible with the typical anolyte and catholyte solutions and provide relatively high surface area and good electrical conductivity. The carbon felt provides for a high number of reaction sites and is a discrete component that is sandwiched or disposed between the bipolar plates, which is typically a solid carbon or conductive polymer material, and the membrane separator. The carbon felts are directly in contact with the bipolar plate. Other materials that can be used for the electrodes are carbon or graphite particles that are embedded directly into the bipolar plates. The significant drawback of the carbon felt electrodes is that it limits the desired current density. In particular, the current densities are believed to be limited by the lack of surface area and the density of electroactive reaction sites.

Therefore, there is a need in the art for flow batteries which utilize electrodes that have improved surface areas so as to allow for higher density reaction sites and, thus, the ability to store and generate higher power output. There is also the need to provide such an improved electrode that minimizes cost.

SUMMARY OF THE INVENTION

In light of the foregoing, it is a first aspect of the present invention to provide high surface area flow battery electrodes.

Another aspect of the present invention is to provide a flow cell battery, comprising at least one anode, at least one cathode, and a separator membrane disposed between each anode and cathode, each anode and cathode comprising a bipolar plate and a carbon nanotube material positioned proximally at least one side of the bipolar plate.

Yet another aspect of the present invention is to provide a method for constructing a flow cell battery, comprising providing at least one separator membrane, placing a bipolar plate on either side of the at least one separator membrane, and providing a carbon nanotube material on at least one side of the bipolar plate.

BRIEF DESCRIPTION OF THE DRAWINGS

This and other features and advantages of the present invention will become better understood with regard to the following description, appended claims, and accompanying drawings wherein:

FIG. 3 is an enlarged schematic diagram of a carbon fiber with carbon nanotubes extending from its surface;

FIG. 4 is a partial schematic perspective representation of a bipolar plate with a covering of carbon nanotubes according to the concepts of the present invention;

FIG. 5 is an enlarged schematic representation of a carbon felt infused with carbon nanotubes according to the concepts of the present invention;

BEST MODE FOR CARRYING OUT THE INVENTION

Figure 1:
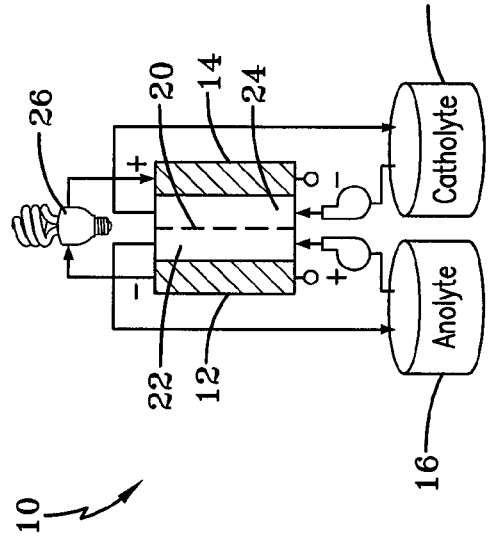
FIG. 1 is a schematic diagram of a prior art flow battery.
Figure 2:
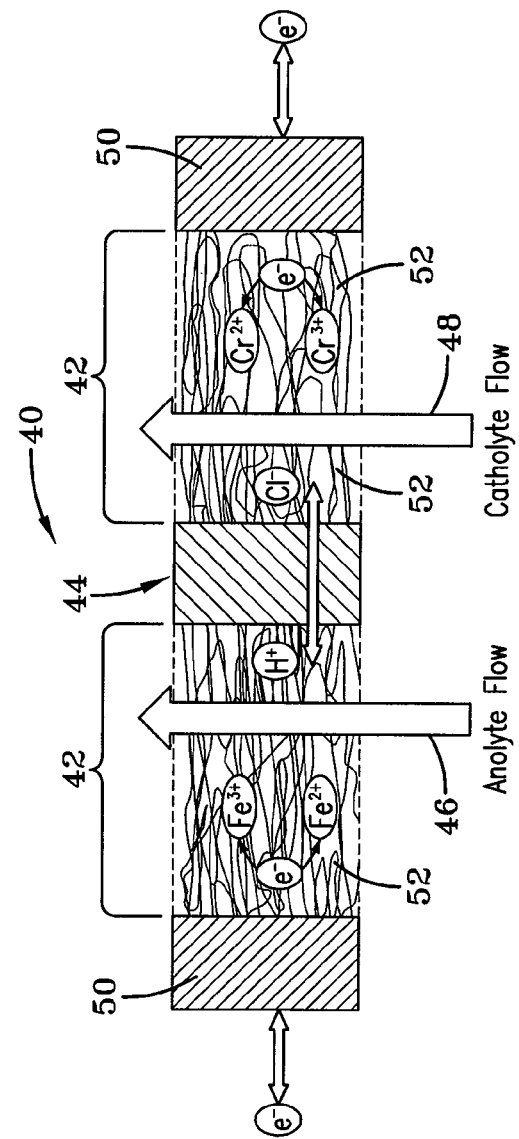
FIG. 2 is an enlarged detailed schematic diagram of a flow cell made in accordance with the concepts of the present invention.

Referring now to FIG. 2, it can be seen that a cell is designated generally by the numeral 40. The cell 40 may be provided in a single configuration or multiple cells may be stacked adjacent one another and utilized to operate as a flow cell battery. Each cell 40 provides two flow channels 42, wherein each flow channel contains either an anode electrode or a cathode electrode. The two flow channels are divided by a separator membrane 44 which is centrally disposed between each electrode and allows for ionic conductivity between an anolyte flow 46 and a catholyte flow 48. In the present embodiment, the separator membrane allows ionic current flow via $H^+$ and/or $Cl^-$ species or the like, while preventing migration of the redox species such as $Fe^{2+}$, $Fe^{3+}$ and $Cr^{2+}$, $Cr^{3+}$ or the like. Each cell 40 is contained within a pair of bipolar plates 50 which are electrically conductive. It will be appreciated that the bipolar plates are current collectors connected in a bipolar topology. The bipolar plate or current collector prevents any mass transfer between adjacent flow regions while maintaining electrical continuity between each cell. Those skilled in the art will recognize that for a multiple cell configuration, bipolar plates will be shared between cells. Disposed between the bipolar plate and the respective membranes is a porous material 52. The material 52 provides high surface area electrodes with catalyst sites where electrons from the bipolar plate 50 can reach the redox species of the anolyte and catholyte fluids flowing therethrough. The filler material 52 is commonly referred to as a felt which may be a woven or non-woven carbon, graphite or like material. The materials 52 typically provide excellent chemical resistance and inert properties with high porosity and good electrical conductivity.

Generally, all of the embodiments described below provide for application of a low production cost method of modifying the bipolar plate, or an associated electrode, directly or indirectly, with some associated material enhanced with carbon nanotubes. In other words, carbon nanomaterial is positioned proximally on at least one side of the bipolar plate or current collector. This could be done by placing the nanomaterial proximally adjacent the plate, or directly coating/growing the nanomaterial on the plate, or coating the associated electrode. These porous carbon nanotube placements or coatings provide up to several orders of magnitude greater active surface area than carbon felt, thereby enabling higher current density through the system. The modified bipolar plates provide a conductive region that extends fully between one side of the bipolar plate and the adjacent separator membrane. It is believed that the key to achieve reduced costs is the ability to apply these carbon nanotube variations at a low cost. Skilled artisans will appreciate that the carbon nanotubes are grown in such a manner that they generally extend substantially perpendicularly or in any angular orientation from a surface. As schematically shown in FIG. 3, carbon nanotubes 53 are shown extending radially from a carbon fiber 54. The number or density of nanotubes extending from a surface may be varied as appropriate. Additionally, the nanotubes may be grown to extend from any shape surface—planar, curved, spherical, ridged, and so on. The tubes may be strictly parallel with each other, form in a radial arrangement or entangled in a mesh.

In a first embodiment shown in FIG. 4, it can be seen that a cell compartment 42A comprises a bipolar plate 50A in which a carbon nanotube layer 52 is provided on each side of the plate. In this embodiment, the bipolar plate 50A is provided with a plurality of channels 56 so as to provide a three dimensional structure on either one or both sides of plate 50A so as to allow either the anolyte or catholyte to flow adjacent thereto. Carbon nanotubes 53 are grown directly, partially or completely, onto the outer surface of the bipolar plate 50A. The nanotubes 53 are relatively much smaller than the thickness of the bipolar plate. In this embodiment, the nanotubes are aligned or oriented so as to extend primarily perpendicularly from the bipolar plate and also extend into the channels 56. As is understood, the plate consists of an electrically conductive material that separates the cells and is resistant to corrosion. In a variation of this embodiment, the bipolar plate could be provided without channels, a flat surface, with the carbon nanotubes extending substantially perpendicularly therefrom. The nanotubes could cover the entire plate surface or the nanotubes could be selectively patterned in such a way to form flow patterns or paths for the anolyte or catholyte.

This implementation has the benefit over the current art of entirely eliminating a component, the carbon felt, in a cell since the electrode functions and bipolar plate functions are effectively integrated with one another. As schematically represented in FIG. 2, the carbon felt which is provided on either side of the electrodes 50 is a porous structure which provides for reaction sites but wherein the reaction sites are randomly disposed about the carbon felt. In distinct contrast, the use of carbon nanotubes 53 in the channels 56 or on the surface as shown in FIG. 4 greatly increases the surface area though which the anolyte and catholyte fluids must flow and, as such, the fluids are exposed to a greater number of reaction sites.

Referring now to FIG. 5, it can be seen that in another embodiment a cell compartment 42B comprises a bipolar plate 50B. In this embodiment, a carbon nanotube infused felt 70, sometimes referred to as an infused fabric, is disposed on each side of the bipolar plate and placed adjacent the respective separator membranes 44. The carbon nanotube infused felt is inserted into the cell in place of the prior art carbon felt. The carbon nanotube infused fabric or tow provides for improved chemical resistance and electrical conductivity and, as in the previous embodiment, much higher surface area to facilitate high current densities.

Figure 6:
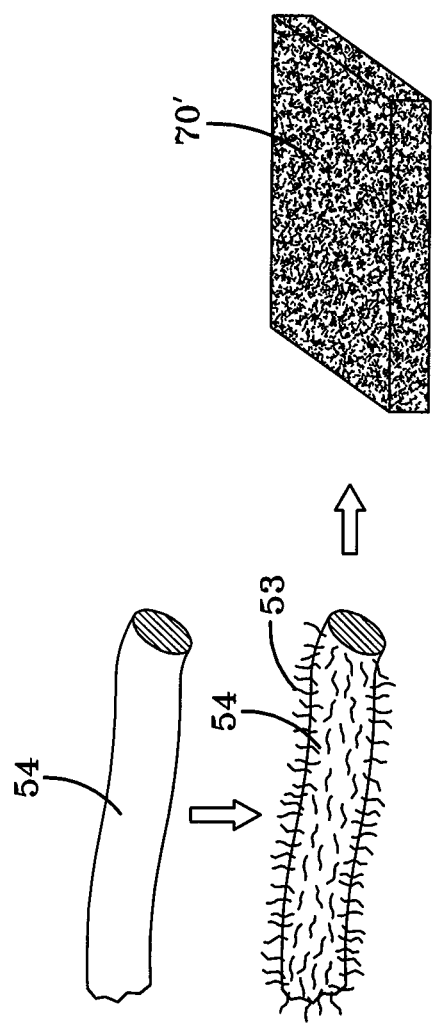
FIG. 6 schematically shows one method of forming a carbon felt infused with carbon nanotubes according to the concepts of the present invention.
Figure 7:
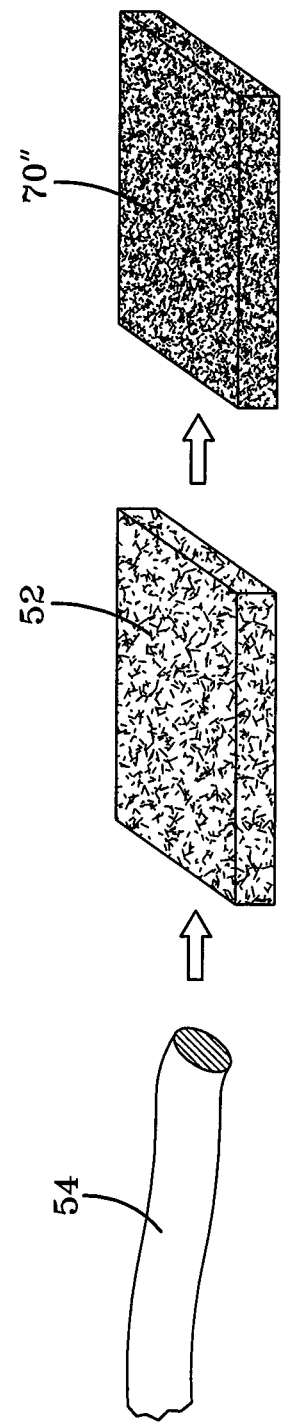
FIG. 7 schematically shows another method of forming a carbon felt infused with carbon nanotubes according to the concepts of the present invention.

For the embodiment shown in FIG. 5, the felt 70 may be constructed in a number of ways. A first method of construction, represented in FIG. 6, is to first manufacture carbon or graphite fibers or filaments 54 and then grow carbon nanotubes 53 on the fibers 54. The infused fibers are then assembled to one another, either in long thread or chopped form, so as to form a non-woven carbon nanotube infused felt 70'. A second method of construction represented in FIG. 7 is to manufacture the filaments 54 and then form them into a non-woven felt 52. Next, the felt is processed so as to grow carbon nanotubes 53 directly on the filaments 54 so as to form a carbon nanotube infused felt 70". As noted previously, the felt 52 is a porous non-woven configuration with many openings and interstices. Accordingly, the nanotubes proliferate throughout the felt and contact the bipolar plate and membrane when those components are assembled. Multiple woven processes could also be used to fabricate a porous electrode structure from fibers or filaments. Indeed, any woven or non-woven three dimensional structure employing the nanotubes 53 could be used.

This embodiment and the related methods of construction are advantageous in that the carbon felt in conventional flow battery stack structures is replaced by a felt that is equivalent at the macroscale, but has up to one to two orders of magnitude or greater surface area, increasing the reaction rate in the anolyte or catholyte and thus increasing the current density of the system without introduced any significant energy loss on the electrochemical reactions. In this embodiment, the carbon felt is provided in combination with the carbon nanotubes which are easily grown on the carbon felt material.

The embodiments shown in FIGS. 4 and 5 may be implemented by treating the carbon nanotube-coated bipolar plates and any variation of the carbon nanotubes with various forms of treatments such as thermal, chemical, so as to increase the number of active sites for the pertinent flow thereby allowing more redox reactions to take place. It will be appreciated that variations in the carbon nanotube growth processes enable the optimization of the carbon nanotube characteristics for redox activity, electrical conductivity and chemical resistance by controlling the nanotubes characteristics such as the configuration of multi-walls, length, density, chirality, defects and other functionalization.

The disclosed configurations are advantageous in that the carbon surface area is increased by up to an order of magnitude or more over the carbon felt and other known prior art configurations. This increase in the microscopic and nanoscopic surface area increases the number of sites available for the associated flow battery anode or cathode reactions to occur. This enables the reactions to take place at a higher rate for a given macroscopic surface area, thereby enabling higher power densities in the cell stack and potentially lower cost systems due to the reduction in material costs per unit, power and energy. It is also believed that this configuration enables the cell and the complete cell stack to operate with higher round-trip efficiencies and reduces the various overpotential losses in the system.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A flow cell battery, comprising:
   at least one anode maintained in a corresponding anolyte flow channel, wherein anolyte fluid flows therethrough;
   at least one cathode maintained in a corresponding catholyte flow channel, wherein catholyte fluid flows therethrough;
   a separator membrane disposed between each said anolyte and catholyte flow channels;
   each said anode and said cathode comprising:
      a bipolar plate and a carbon nanomaterial positioned proximally at least one side of said bipolar plate, said carbon nanomaterial providing sites for liquid phase reduction-oxidation reactions.

2. The battery according to claim 1, wherein at least one side of said bipolar plate has a plurality of channels so as to provide an embedded flow pattern.

3. The battery according to claim 2, wherein said plurality of channels are covered with carbon nanomaterial.

4. The battery according to claim 3, wherein said carbon nanomaterial is carbon nanotubes aligned substantially perpendicular to said bipolar plate.

5. The battery according to claim 1, wherein said bipolar plate is covered by said carbon nanomaterial.

6. The battery according to claim 5, wherein said carbon nanomaterial is substantially perpendicular to said bipolar plate.

7. The battery according to claim 6, wherein said carbon nanomaterial is disposed in a pattern to form a flow pattern.

8. The battery according to claim 1, wherein said carbon nanomaterial is porous and extends at least partially between said bipolar plate and said adjacent separator membrane.

9. The battery according to claim 8, wherein said carbon nanomaterial is disposed throughout a carbon felt material.

10. The battery according to claim 9, wherein said carbon felt material comprises a plurality of carbon filaments and said carbon nanomaterial extending substantially radially from said filaments.

11. A method for constructing a flow cell battery, comprising:
   providing at least one separator membrane between corresponding anolyte and catholyte flow channels wherein anolyte and catholyte fluids flow through their respective channels;
   placing a bipolar plate on either side of said at least one separator membrane; and
   providing carbon nanomaterial on at least one side of said bipolar plate such that said carbon nanomaterial extends into said adjacent flow channel to provide sites for liquid phase reduction-oxidation reactions.

12. The method according to claim 11, further comprising:
   providing said bipolar plate with plate channels such that said carbon nanomaterial extends into said plate channels.

13. The method according to claim 11, further comprising:
   forming said carbon nanomaterial on carbon fibers;
   cutting said carbon fibers; and
   forming a non-woven felt from said cut carbon fibers, wherein said felt is positioned adjacent at least one side of said bipolar plate.

14. The method according to claim 11, further comprising:
   forming a carbon felt;
   forming carbon nanotubes on said carbon felt; and
   positioning said felt adjacent at least one side of said bipolar plate.

15. The method according to claim 11, further comprising:
forming said carbon nanomaterial on a bipolar plate that is a three dimensional structure.

* * * * *